(12) United States Patent
Watanabe et al.

(10) Patent No.: US 10,622,592 B2
(45) Date of Patent: Apr. 14, 2020

(54) ELECTROCHEMICAL CELL AND MANUFACTURING METHOD OF THE ELECTROCHEMICAL CELL

(71) Applicant: Seiko Instruments Inc., Chiba-shi, Chiba (JP)

(72) Inventors: Shunji Watanabe, Chiba (JP); Kazumi Tanaka, Chiba (JP); Yoshimi Kanno, Chiba (JP); Tsuneaki Tamachi, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 219 days.

(21) Appl. No.: 15/816,348

(22) Filed: Nov. 17, 2017

(65) Prior Publication Data

US 2018/0145284 A1 May 24, 2018

(30) Foreign Application Priority Data

Nov. 22, 2016 (JP) .................................. 2016-227168

(51) Int. Cl.
*H01M 2/02* (2006.01)
*B21D 51/54* (2006.01)
(Continued)

(52) U.S. Cl.
CPC .......... *H01M 2/0222* (2013.01); *B21D 51/54* (2013.01); *B29C 53/005* (2013.01); *B29C 53/02* (2013.01);
(Continued)

(58) Field of Classification Search
CPC .. H01M 2/0222; H01M 2/06; H01M 10/0427; H01M 2/204; H01M 2/0408;
(Continued)

(56) References Cited

U.S. PATENT DOCUMENTS

2011/0244315 A1* 10/2011 Yoon .................... H01M 2/0207
429/176
2012/0219847 A1* 8/2012 Hong .................... H01M 2/021
429/163

(Continued)

FOREIGN PATENT DOCUMENTS

JP   01-163960 A   6/1989
JP   2002-117904 A   4/2002

(Continued)

OTHER PUBLICATIONS

EPO website (www.espacenet.com) machine translation of the detailed description of JP 2002-319375A (Year: 2002).*

(Continued)

*Primary Examiner* — Gregg Cantelmo
(74) *Attorney, Agent, or Firm* — Brinks Gilson & Lione (57) ABSTRACT

An electrochemical cell includes an electrode body which includes a positive electrode and a negative electrode and an outer package which is formed by overlapping a first member and a second member. The outer package includes: a housing portion which houses the electrode body; and a sealing portion which is formed along an outer circumference of the housing portion, by fusing and bending the first member and the second member, at a portion corresponding to the outer circumference of the housing portion.

12 Claims, 9 Drawing Sheets

(51) Int. Cl.
| | |
|---|---|
| B29C 53/02 | (2006.01) |
| H01M 2/04 | (2006.01) |
| H01M 10/04 | (2006.01) |
| B29C 53/00 | (2006.01) |
| B29C 65/00 | (2006.01) |
| B29C 70/88 | (2006.01) |
| B32B 15/01 | (2006.01) |
| B32B 15/085 | (2006.01) |
| B32B 37/06 | (2006.01) |
| B32B 37/12 | (2006.01) |
| H01M 2/06 | (2006.01) |
| B29C 65/08 | (2006.01) |
| B29C 65/50 | (2006.01) |
| B29C 65/48 | (2006.01) |
| B29C 65/02 | (2006.01) |
| B29C 65/16 | (2006.01) |
| B21D 22/02 | (2006.01) |
| B29K 23/00 | (2006.01) |
| B29K 105/00 | (2006.01) |
| B29L 31/34 | (2006.01) |

(52) U.S. Cl.
CPC .......... *B29C 66/742* (2013.01); *B29C 70/882* (2013.01); *B32B 15/01* (2013.01); *B32B 15/085* (2013.01); *B32B 37/06* (2013.01); *B32B 37/12* (2013.01); *H01M 2/022* (2013.01); *H01M 2/0408* (2013.01); *H01M 2/0417* (2013.01); *H01M 2/06* (2013.01); *H01M 10/0422* (2013.01); *H01M 10/0427* (2013.01); *B21D 22/02* (2013.01); *B29C 65/02* (2013.01); *B29C 65/08* (2013.01); *B29C 65/16* (2013.01); *B29C 65/4815* (2013.01); *B29C 65/5057* (2013.01); *B29C 66/0324* (2013.01); *B29C 66/0326* (2013.01); *B29C 66/112* (2013.01); *B29C 66/1122* (2013.01); *B29C 66/131* (2013.01); *B29C 66/24221* (2013.01); *B29C 66/24245* (2013.01); *B29C 66/53462* (2013.01); *B29C 66/54* (2013.01); *B29C 66/612* (2013.01); *B29C 66/71* (2013.01); *B29C 66/72321* (2013.01); *B29C 66/7392* (2013.01); *B29C 66/73713* (2013.01); *B29C 66/73921* (2013.01); *B29C 66/7422* (2013.01); *B29C 66/74281* (2013.01); *B29C 2793/00* (2013.01); *B29C 2793/0027* (2013.01); *B29K 2023/06* (2013.01); *B29K 2023/12* (2013.01); *B29K 2105/253* (2013.01); *B29K 2823/00* (2013.01); *B29L 2031/3468* (2013.01); *B32B 2307/202* (2013.01); *B32B 2311/24* (2013.01); *B32B 2323/04* (2013.01); *B32B 2323/10* (2013.01); *B32B 2457/10* (2013.01)

(58) Field of Classification Search
CPC .. H01M 2/0426; B29C 53/005; B29C 66/742; B29C 70/882; B29C 793/0027; B29C 65/02; B29C 65/08; B29C 65/16; B29C 65/4815; B29C 65/5057; B29C 66/0324; B29C 66/0326; B29C 66/112; B29C 66/1122; B29C 66/131; B29C 66/24221; B29C 66/24245; B29C 66/53462; B29C 66/54; B29C 66/612; B29C 66/71; B29C 66/72321; B29C 66/73713; B29C 66/7392; B29C 66/73921; B29C 66/7422; B29C 66/74281; B29C 2793/00; B29C 2793/0027; B32B 15/01; B32B 15/085; B32B 37/06; B32B 37/12; B32B 2307/202; B32B 2311/24; B32B 2323/04; B32B 2323/10; B32B 2457/10; B21D 22/02; B29K 2023/26; B29K 2023/12; B29K 2105/253; B29K 2023/06; B29K 2823/00; B29L 2031/3468
USPC ........................................................ 29/623.2
See application file for complete search history.

(56) References Cited

U.S. PATENT DOCUMENTS

| | | | |
|---|---|---|---|
| 2016/0093839 A1* | 3/2016 | Iseri | .................. H01M 2/0207 429/127 |
| 2017/0005302 A1 | 1/2017 | Muroi | |

FOREIGN PATENT DOCUMENTS

| | | | |
|---|---|---|---|
| JP | 2002-298803 | A | 10/2002 |
| JP | 2002-319375 | A | 10/2002 |
| JP | 2003-223874 | A | 8/2003 |
| JP | 2005-044583 | A | 2/2005 |
| JP | 2005-340046 | A | 12/2005 |
| JP | 2008-016368 | A | 1/2008 |
| JP | 2011-204590 | A | 10/2011 |
| WO | WO 2015/141772 | A1 | 9/2015 |

OTHER PUBLICATIONS

EPO website (www.espacenet.com) machine translation of the detailed description of JP 2008-016368A (Year: 2008).*
Office Action, and English language translation thereof, in corresponding Japanese Application No. 2016-227168, dated Oct. 24, 2017, 13 pages.

\* cited by examiner

ELECTROCHEMICAL CELL AND MANUFACTURING METHOD OF THE ELECTROCHEMICAL CELL

RELATED APPLICATIONS

This application claims priority under 35 U.S.C. § 119 to Japanese Patent Application No. 2016-227168 filed on Nov. 22, 2016, the entire content of which is hereby incorporated by reference.

BACKGROUND OF THE INVENTION

Field of the Invention

The present invention relates to an electrochemical cell and a manufacturing method of the electrochemical cell.

Priority is claimed on Japanese Patent Application No. 2016-227168, filed on Nov. 22, 2016, the contents of which are incorporated herein by reference.

Background Art

As electrochemical cells such as a nonaqueous electrolyte secondary battery, an electric double layer capacitor or the like, the electrochemical cell which is formed in a button type (hereinafter, including a coin type and a cylinder type) is suggested. The electrochemical cell of the button type is used as a power source of various devices. As one example of the electrochemical cell of the button type, a battery which is disclosed in Japanese Unexamined Patent Application, First Publication No. 2002-298803 is suggested.

In Japanese Unexamined Patent Application, First Publication No. 2002-298803, an outer package is disclosed in which a negative electrode case that is made of metal and that serves as a negative electrode terminal and a positive electrode case that is made of metal and serves as a positive electrode terminal are fitted via an insulation gasket is disclosed. In particular, in Japanese Unexamined Patent Application, First Publication No. 2002-298803, the positive electrode case is fitted to the negative electrode case via the insulation gasket by caulking. A sealing portion of the outer package is formed by a caulked portion.

Accordingly, the outer package is partitioned with the positive electrode case and the negative electrode case, and an electrode body is included in a housing portion of the outer package with a nonaqueous electrolyte.

SUMMARY OF THE INVENTION

However, when the sealing portion of the outer package is caulked, it is difficult to suppress the size of the sealing portion with respect to the size of the housing portion when the size of the battery is smaller. Thus, it is difficult to increase the capacity of the battery per unit volume. The electrochemical cell admits of improvement in this respect.

An object of the present invention is to provide an electrochemical cell and the manufacturing method of the electrochemical cell which can suppress the size of the sealing portion.

An electrochemical cell of the present invention includes an electrode body which includes a positive electrode and a negative electrode and an outer package which is formed by overlapping a first member and a second member. The outer package includes: a housing portion which houses the electrode body; and a sealing portion which is formed along an outer circumference of the housing portion, by fusing and bending the first member and the second member, at a portion corresponding to the outer circumference of the housing portion.

According to the present invention, the sealing portion is formed along an outer circumference of the housing portion, by fusing and bending the first member and the second member, at a portion corresponding to the outer circumference of the housing portion. Consequently, the sealing portion can be approached to the outer circumference of the housing portion. Accordingly, the overhanging portion of the sealing portion in a direction orthogonal to the center axis of the housing portion can be reduced. Thus, in a compact electrochemical cell in particular, the capacity of the battery per unit volume can be enhanced.

In the above electrochemical cell, at least a part of the sealing portion may be formed in a curved shape along the outer circumference of the housing portion.

According to the present invention, at least a part of the sealing portion is formed in a curve shape along the outer circumference of the housing portion. The curved sealing portion can approach the outer circumference of the housing portion by bending the sealing portion along the outer circumference of the housing portion. Accordingly, the overhanging portion of the curved sealing portion in a direction orthogonal to the center axis of the housing portion can be reduced.

In the above electrochemical cell, the electrochemical cell may include a terminal part which is supported by the sealing portion. The terminal part may be formed by bending together with the sealing portion.

According to the present invention, the terminal part is formed by bending together with the sealing portion. Consequently, the terminal part can be approached to the housing portion side. Accordingly, the overhanging portion of the terminal part in a direction orthogonal to the center axis of the housing portion can be reduced.

In the above electrochemical cell, the sealing portion of the first member may be thinner than the other portions of the first member and the sealing portion of the second member may be thinner than the other portions of the second member.

According to the present invention, the sealing portion of the first member is thinner than the other portions of the first member, and the sealing portion of the second member is thinner than the other portions of the second member. The overhanging portion of the sealing portion can be further reduced by forming the thickness of the sealing portion thinly.

When the first member and the second member are formed by the laminate member which includes a metal sheet, a gap between the metal sheet of the first container and the metal sheet of the second container can be reduced by forming the laminate member thinly. It is possible to further prevent water from entering inside of the outer package from the sealing portion.

In the above electrochemical cell, at least one of the first member and the second member may be formed by a laminate member. A through electrode which penetrates the laminate member may be provided at the laminate member.

According to the present invention, at least one of the first member and the second member is formed by a laminate member. A through electrode which penetrates into the laminate member is provided at the laminate member. It is not necessary to allow the terminal portion to be protruded to an outside from the sealing portion by providing the through electrode. Consequently, the electrochemical cell can be miniaturized.

In the above electrochemical cell, the second member may be formed by metal when the first member is formed by a laminate member, or the first member may be formed by metal when the second member is formed by a laminate member.

According to the present invention, the second member is formed by metal when the first member is formed by a laminate member, or the first member is formed by metal when the second member is formed by a laminate member. Consequently, the first member or the second member can be used as a terminal part of metal.

A manufacturing method of the electrochemical cell of the present invention includes: a sealing process that seals a sealing portion of an outer circumference of a housing portion in which houses an electrode body; a fixing process that fixes a part of the sealing portion which is sealed in the sealing process; and a molding process that bends other portion of the sealing portion that is not fixed in the fixing process, while the fixing process is being performed.

According to the present invention, a part of the sealing portion is fixed after the sealing portion is fused. Furthermore, other portion of the sealing portion that is not fixed in the fixing process is bent while the part of the sealing portion is fixed.

Consequently, the sealing portion approaches the outer circumference of the housing portion. Thus, the overhanging portion of the sealing portion in a direction orthogonal to the center axis of the housing portion can be reduced. Thus, in a compact electrochemical cell in particular, the capacity of the battery per unit volume can be enhanced.

The above manufacturing method of the electrochemical cell may include a cutting process that cuts the part of the sealing portion after the molding process.

According to the present invention, the overhanging portion of the sealing portion in a direction orthogonal to the center axis of the housing portion can be reduced by cutting the part of the sealing portion.

In the above manufacturing method of the electrochemical cell, the other portion of the sealing portion may be bent by a molding die, and the part of the sealing portion may be cut by the molding die in the molding process.

According to the present invention, the part of the sealing portion is cut by the molding die after the sealing portion is bent by the molding die. Consequently, a part of the sealing portion is quickly cut after bending the portion of the sealing portion by the molding die, and it is possible to improve productivity of the electrochemical cell.

In the above manufacturing method of the electrochemical cell, the other portion of the sealing portion may be bent by a molding die, and the part of the sealing portion may be cut by another cutting apparatus different from the molding die in the molding process.

According to the present invention, the part of the sealing portion is cut by another cutting apparatus different from the molding die after the sealing portion is bent by the molding die. Consequently, the suitable cutting apparatus for the cut of the sealing portion can be selected, and the part of the sealing portion can be cut suitably from the sealing portion by the selected cutting apparatus.

According to the present invention, the sealing portion is bent along the outer circumference of the housing portion while the sealing portion is fused. Accordingly, the overhanging portion of the sealing portion in a direction orthogonal to the center axis of the housing portion can be reduced. Thus, in a compact electrochemical cell in particular, the capacity of the battery per unit volume can be enhanced.

DETAILED DESCRIPTION OF THE INVENTION

An embodiment of the present invention will be described with reference to the drawings. In the below description, a lithium ion secondary battery (hereinafter, simply "battery") that is a type of nonaqueous electrolyte secondary battery has been described as an example of an electrochemical cell of a button type that is cylindrically formed, a coin type, and a cylinder type.

First Embodiment

Figure 1:
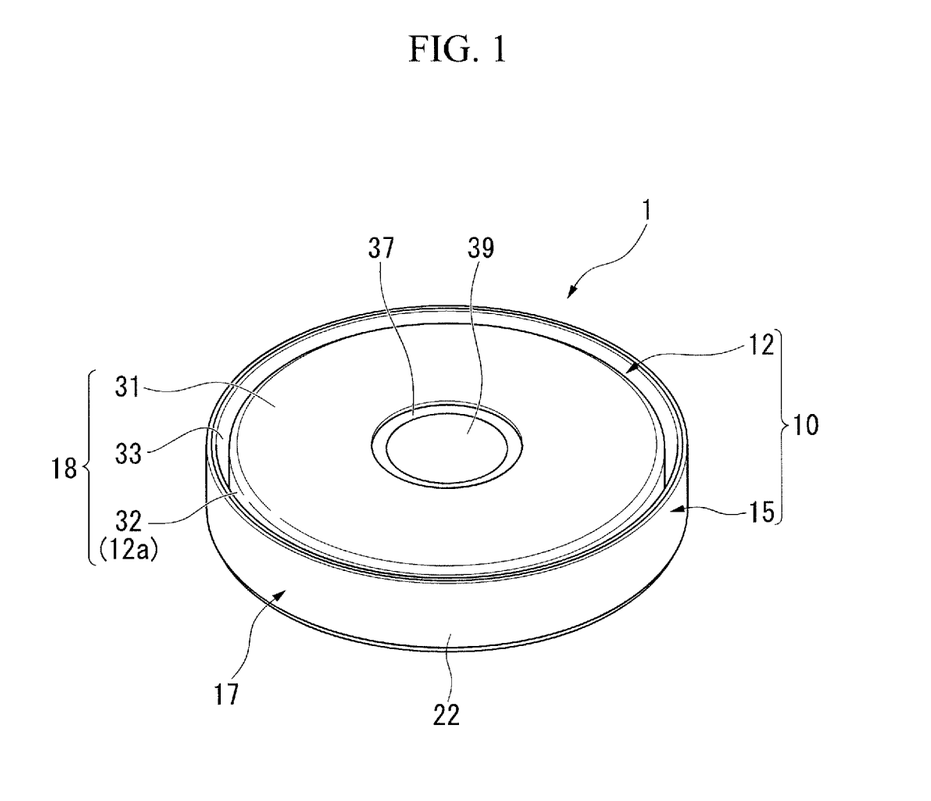
FIG. 1 is a perspective view illustrating a battery of the first embodiment.
Figure 2:
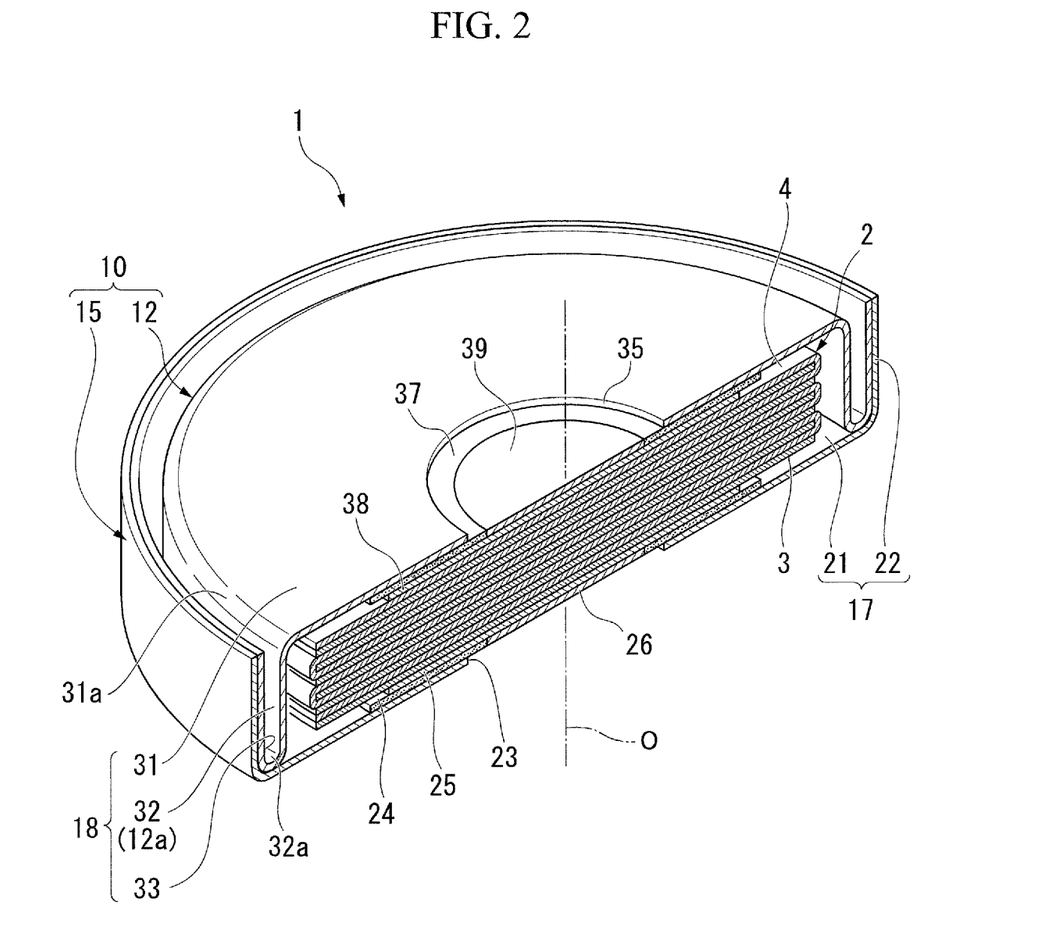
FIG. 2 is a cross-sectional view illustrating a battery of the first embodiment.

FIG. 1 is a perspective view illustrating a battery of the first embodiment. FIG. 2 is a cross-sectional view illustrating a battery of the first embodiment. As shown in FIG. 1 and FIG. 2, a battery 1 is a button shaped battery. The battery 1 includes an electrode body 2, electrolyte solution (not shown) that is impregnated with the electrode body 2, and an outer package 10 in which the electrode body 2 is housed.

The electrode body 2 includes a negative electrode 3 and a positive electrode 4. The negative electrode 3 is folded in zigzag form. The positive electrode 4 is folded in zigzag form so as to be stacked alternately with the negative electrode 3 in a direction intersecting with the negative electrode 3. That is, the electrode body 2 is an electrode body of a stacked type that is folded so that the negative electrode 3 and the positive electrode 4 are stacked alternately with each other.

The outer package 10 includes a housing portion 12 in which the electrode body 2 is housed and a sealing portion 15 that is formed along an outer circumference 12a of the housing portion 12 by bending a first container 17 and a second container 18 (described below) at a portion corresponding to an outer circumference 12a of the housing portion 12. The sealing portion 15 is formed along the outer circumference 12a of the housing portion 12 by drawing the first container 17 and the second container 18.

The outer package 10 includes the first container 17 that has a bottom and a tubular shape, and the second container 18 that has a bottom and a tubular shape. The first container 17 and the second container 18 are arranged so that a center axis of the first container 17 is coaxial with a center axis of the second container 18. The center axis of the first container 17 and the center axis of the second container 18 are set as a center axis O, a direction along the center axis O is set as an axis direction, and a direction orthogonal to the center axis O is set as a radial direction. The center axis O is a center axis of the housing portion 12.

The first container 17 is a first member that is formed by a laminate member. The laminate member is configured to stack a metal sheet, a resin fusion layer that configures an inside surface of the first container 17, and a resin protective layer that configures an outside surface of the first container 17. The fusion layer is formed by using thermoplastic resin such as polyethylene, polypropylene, or the like of polyolefin.

The below material as polyolefin can be properly selected. As polyolefin, the material of high-pressure method and low-density polyethylene, low-pressure method and high-density polyethylene, inflation polypropylene film, non-stretched polypropylene film, biaxially-stretched polypropylene film, linear short-chain branched polyethylene or the like can be used. The protective layer is formed by using polyester of the above mentioned polyolefin, polyethylene terephthalate or the like, and nylon.

A joint layer is provided between the metal sheet and the fusion layer and between the metal sheet and the protective layer. The fusion layer and the protective layer are joined to the metal sheet via the joint layer by heat fusion or adhesive.

The first container 17 includes a first bottom wall portion 21 and a first peripheral wall portion 22. A first through hole 23 is formed in the first bottom wall portion 21. The first through hole 23 is formed so as to be coaxial with the center axis O. The first peripheral wall portion 22 is formed by bending the first container 17 approximately at right angles to the first bottom wall portion 21.

A copper plate 25 is joined to an inner surface of the first bottom wall portion 21 via a first sealant ring 24 by heat fusion.

The first sealant ring 24 is a ring shaped sealant film and is formed by using thermoplastic resin such as polyethylene, polypropylene, or the like of polyolefin.

An inner surface of the copper plate 25 is connected to the negative electrode 3 of the electrode body 2. A nickel plate 26 is welded to a center of an outer surface of the copper plate 25. The nickel plate 26 is exposed to an outside through the first through hole 23, and acts as a negative electrode terminal 26 of the battery 1. The negative electrode terminal 26 of the battery 1 is a through electrode. When the copper plate 25 is made from nickel, the nickel plate 26 may not be provided.

The second container 18 is a second member that is formed by a laminate member similarly to the first container 17. The laminate member is configured to stack a metal sheet, a resin fusion layer that configures an inside surface of the second container 18, and a resin protective layer that configures an outside surface of the second container 18.

The fusion layer is formed by using thermoplastic resin the same as the fusion layer of the first container 17. The protective layer is formed by using thermoplastic resin the same as the protective layer of the first container 17.

The second container 18 includes a second bottom wall portion 31, a second peripheral wall portion 32, and a bending portion 33. The second peripheral wall portion 32 is formed by bending the second container 18 approximately at right angles to the second bottom wall portion 31. The bending portion 33 is formed by bending the second container 18 approximately in parallel with the second peripheral wall portion 32. The second peripheral wall portion 32 forms the outer circumference 12a of the housing portion 12.

A second through hole 35 is formed in the second bottom wall portion 31. The second through hole 35 is formed so as to be coaxial with the center axis O.

An aluminum plate 38 is joined to an inner surface of the second bottom wall portion 31 via a second sealant ring 37 by heat fusion. The second sealant ring 37 is formed by using thermoplastic resin similarly to the first sealant ring 24.

An inner surface of the aluminum plate 38 is connected to the positive electrode 4 of the electrode body 2. A nickel plate 39 is welded to a center of an outer surface of the aluminum plate 38. The nickel plate 39 is exposed to an outside through the second through hole 35, and acts as a positive electrode terminal 39 of the battery 1. The positive electrode terminal 39 of the battery 1 is a through electrode.

In this way, the first container 17 and the second container 18 are formed by the laminate member, and the through electrode 26 is provided at the first container 17 and the through electrode 39 is provided at the second container 18.

It is not necessary to allow the terminal portion to be protruded to an outside from the sealing portion 15 since the through electrode 26 and the through electrode 39 are provided. Accordingly, the battery 1 can be miniaturized.

The second peripheral wall portion 32 is formed by bending the second container 18 in a cylindrical shape from an outer surface 31a of the second bottom wall portion 31 toward the first bottom wall portion 21 of the first container 17. The bending portion 33 is formed by bending in a cylindrical shape from an end portion 32a of the first bottom wall portion 21 side along the second peripheral wall portion 32 to the second bottom wall portion 31 side in the second peripheral wall portion 32. The bending portion 33 is arranged radially outward from respect to the second peripheral wall portion 32 at an interval. The cross sectional shape which is formed by the bending portion 33 and the second peripheral wall portion 32 is a U-shape.

The second peripheral wall portion 32 is arranged inside the first peripheral wall portion 22 and inside the bending portion 33. The bending portion 33 is arranged inside the first peripheral wall portion 22. The fusion layer of the bending portion 33 and the fusion layer of the first peripheral wall portion 22 are joined by heat fusion.

The sealing portion 15 is formed by the fusion layer of the first peripheral wall portion 22 and the fusion layer of the bending portion 33 being joined by heat fusion. The outer circumference 12a of the housing portion 12 is sealed by the sealing portion 15. Accordingly, the outer package 10 is formed by overlapping the first container 17 and the first container 18.

The heat fusion using a heat source such as heater, laser, or the like is mentioned as a means of the heat fusion between the fusion layer of the bending portion 33 and the fusion layer of the first peripheral wall portion 22. The fusion layer of the bending portion 33 and the fusion layer of the first peripheral wall portion 22 may be fused using, for example, an ultrasonic welding besides the heat fusion. The sealing portion 15 is cylindrically formed outside the housing portion 12 and is bent along the outer circumference 12a of the housing portion 12. The outer circumference 12a of the housing portion 12 is formed by the second peripheral wall portion 32. The sealing portion 15 is formed roundly in plan view and includes a bending portion.

The sealing portion 15 may is approached to the outer circumference 12a of the housing portion 12 by bending the sealing portion 15 along the outer circumference 12a. The overhanging portion of the sealing portion 15 in a direction orthogonal to the center axis O of the housing portion 12 can be reduced. Accordingly, especially in a compact battery, the capacity of the battery 1 per unit volume can be enhanced.

The sealing portion 15 is bent by drawing the first container 17 and the second container 18, and is formed along the outer circumference 12a of the housing portion 12. The thickness of the sealing portion 15 is smaller than the thickness of other portions of the first container 17. The thickness of the sealing portion 15 is smaller than the thickness of other portions of the second container 18. Specifically, the other portions are the first bottom wall portion 21, the first peripheral wall portion 22, the second bottom wall portion 31, the second peripheral wall portion 32, and a bending portion 33.

The sealing portion 15 is formed thinly. Accordingly, the overhanging portion of the sealing portion 15 in a direction orthogonal to the center axis O of the housing portion 12 can be further reduced.

A gap between the metal sheet of the first container 17 and the metal sheet of the second container 18 can be reduced by forming the fusion layer of the first container 17 and the fusion layer of the first container 18 thinly. Consequently, it is possible to further prevent water from entering inside of the outer package 10 from the sealing portion 15.

A sealed space is formed by overlapping the first container 17 and the first container 18 in the housing portion 12. Specifically, the housing portion 12 is partitioned into the first bottom wall portion 21, the second bottom wall portion 31, and the second peripheral wall portion 32.

Next, a method for manufacturing the battery 1 will be described based on FIGS. 3 to 6. The first container 17 before molding is described as a the first container material 17A, and the second container 18 before molding is described as a the second container material 18A.

Figure 3A:
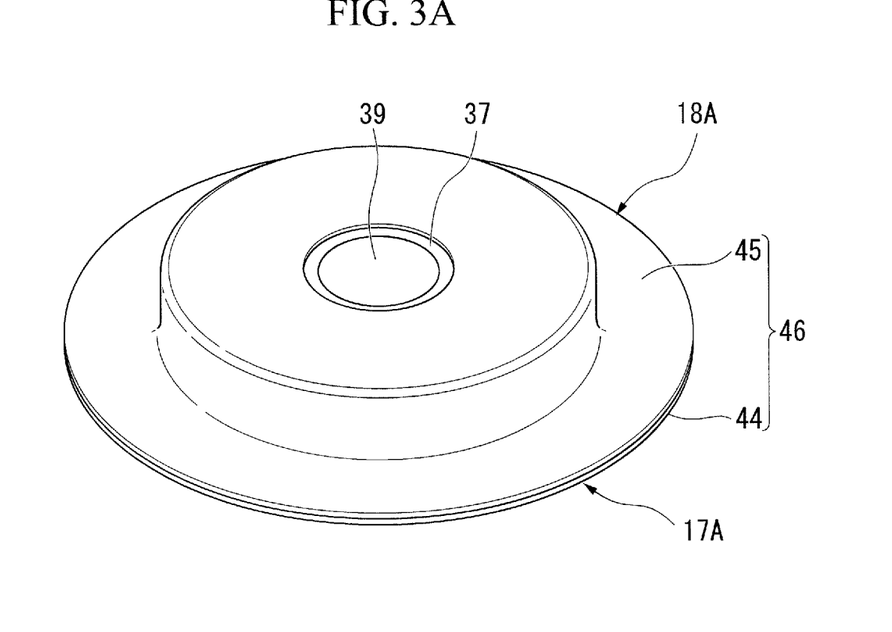
FIG. 3A and FIG. 3B are perspective views illustrating a status of a battery before molding.
Figure 3B:
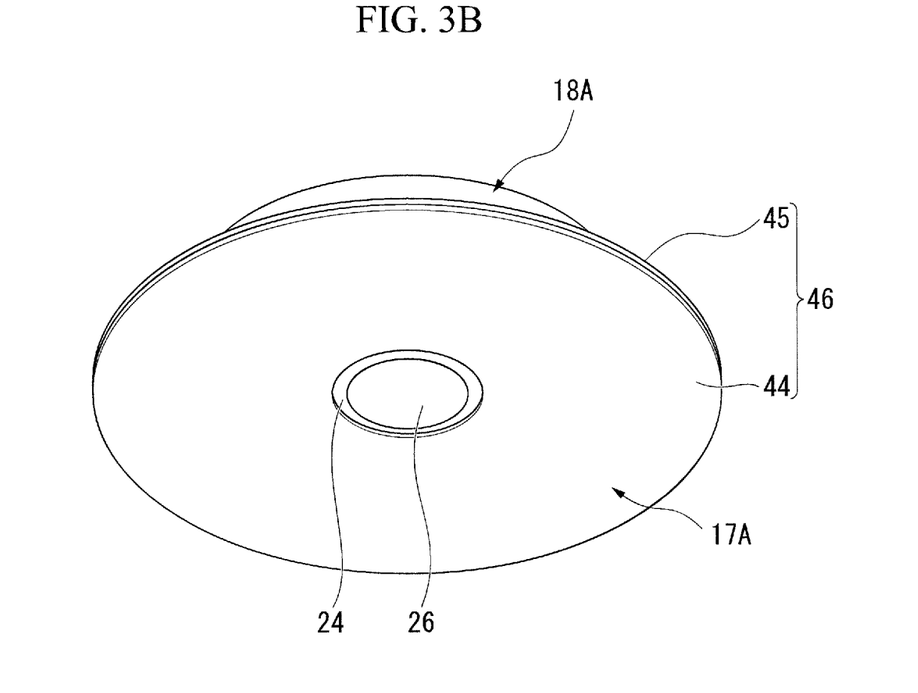

FIG. 3A and FIG. 3B are perspective views illustrating a status of a battery before molding.

In a sealing process, the nickel plate 26 is welded to an inside surface of the first container material 17A via the first sealant ring 24 and the copper plate 25 (as shown in FIG. 2). The negative electrode terminal 26 is formed by the nickel plate 26. The nickel plate 39 is welded to an inside surface of the second container material 18A via the second sealant ring 37 and the aluminum plate 38 (as shown in FIG. 2). The positive electrode terminal 39 is formed by the nickel plate 39.

The electrode body 2 (as shown in FIG. 2) is housed in a projected portion 42 of the second container material 18A from the inside, and the first container material 17A and the second container material 18A are overlapped. A first flange 44 of the first container material 17A and a second flange 45 of the second container material 18A are sealed by heat fusion. A sealed heat fusion portion 46 is cylindrically formed.

Figure 4A:
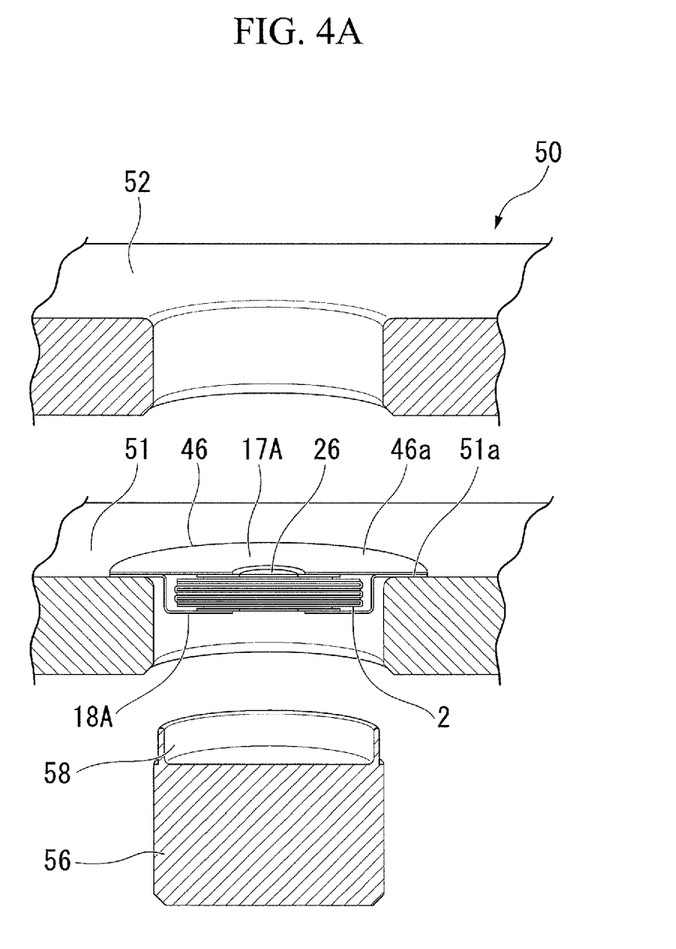
FIG. 4A is a cross-sectional view illustrating a state where the battery before molding is arranged at a molding die.
Figure 4B:
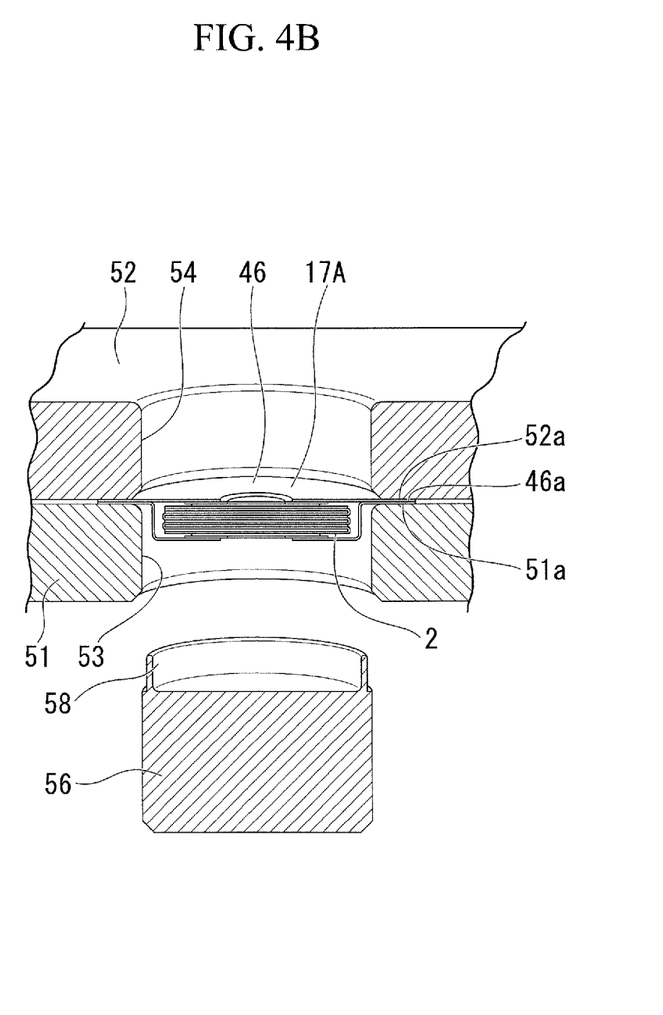
FIG. 4B is a cross-sectional view illustrating a state where the battery before molding is fixed by the molding die.

FIG. 4A is a cross-sectional view illustrating a state where the battery before molding is arranged at a molding die. FIG. 4B is a cross-sectional view illustrating a state where the battery before molding is fixed by the molding die.

In a fixing process of FIG. 4A, the first container material 17A and the second container material 18A are arranged at a molding die 50. Especially, an outer circumference 46a of the sealed heat fusion portion 46 is mounted on a mounted portion 51a of a lower mold 51 of the molding die 50. The first container material 17A is faced to the upper mold 52 of the molding die 50. The sealed heat fusion portion 46 is arranged coaxially with a lower through hole 53 of the lower mold 51.

In a fixing process of FIG. 4B, the outer circumference 46a of the sealed heat fusion portion 46 is fixed and is held by the mounted portion 51a of the lower mold 51 and a pressing portion 52a of the upper mold 52. The sealed heat fusion portion 46 is arranged coaxially with the lower through hole 53 of the lower mold 51 and an upper through hole 54 of the upper mold 52. An inner diameter of the lower through hole 53 and the upper through hole 54 are formed identically.

Figure 5A:
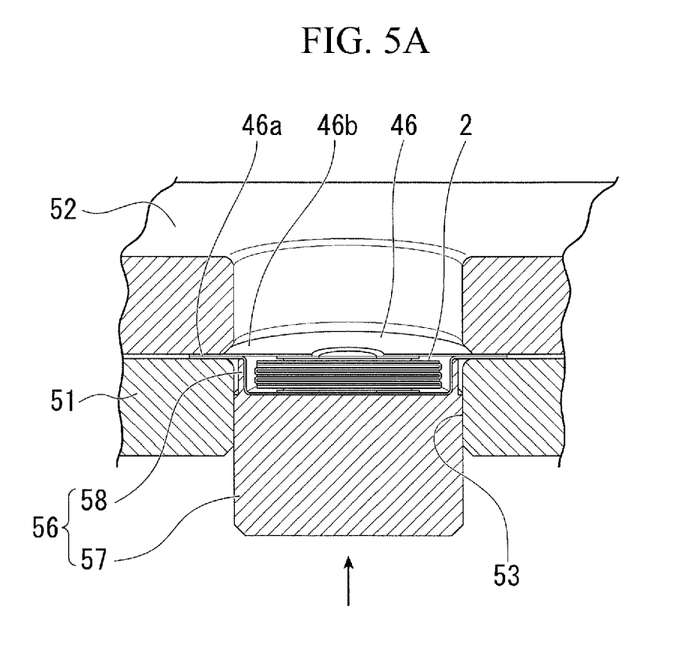
FIG. 5A is a cross-sectional view illustrating a state where a punch is moved to the battery before molding.
Figure 5B:
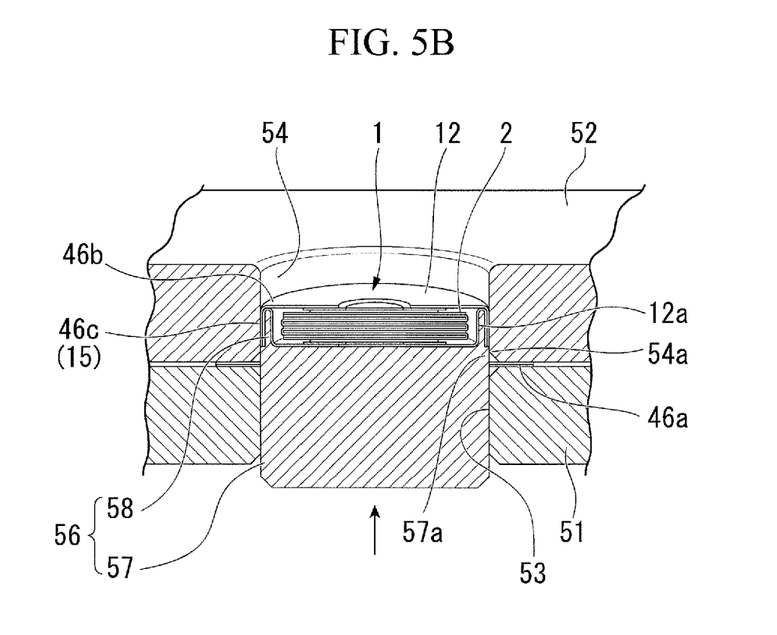
FIG. 5B is a cross-sectional view illustrating a state where the battery before molding is to be molded.

FIG. 5A is a cross-sectional view illustrating a state where a punch is moved to the battery before molding. FIG. 5B is a cross-sectional view illustrating a state where the battery before molding is to be molded.

In a molding process of FIG. 5A, a punch 56 is raised in a direction shown by an arrow. The punch 56 includes a base 57 which is formed to be capable of fitting to the lower through hole 53 and a molding portion 58 which has a ring shape and is formed on an upper portion of the base 57. An outer diameter of the molding portion 58 is formed smaller than the inner diameter of the lower through hole 53 and the upper through hole 54. A gap is formed between the lower through hole 53 and the molding portion 58. Similarly, a gap is formed between the upper through hole 54 and the molding portion 58 (as shown in FIG. 5B).

The punch 56 is raised and is fitted to the lower through hole 53, and the molding portion 58 is contacted to a vicinity 46b of the outer circumference 46a of the sealed heat fusion portion 46.

In a molding process of FIG. 5B, the punch 56 is raised continuously in the direction shown by the arrow and the vicinity 46b of the outer circumference 46a is lifted by the molding portion 58. A segment 46c of the sealed heat fusion portion 46 that is not held by the lower mold 51 and the upper mold 52 is drawn cylindrically using an inner surface of the upper through hole 54 and an outer surface of the molding portion 58. The segment 46c of the sealed heat fusion portion 46 is bent along the outer circumference 12a of the housing portion 12, and the sealing portion 15 is formed. The segment 46c does not include the outer circumference 46a of the sealed heat fusion portion 46.

In a cutting process, after the sealed heat fusion portion 46 is drawn, the punch 56 is raised continuously in the direction shown by the arrow. An upper end 57a of the base 57 reaches the upper through hole 54. The outer circumference 46a is cut by the upper end 57a of the base 57 and an lower end 54a of the upper through hole 54 from the sealing portion 15 that is drawn. Accordingly, the housing portion 12 is sealed by the sealing portion 15. The sealing portion 15 of the outer package 10 is formed along the outer circumference 12a of the housing portion 12, and the battery 1 is manufactured.

Figure 6:
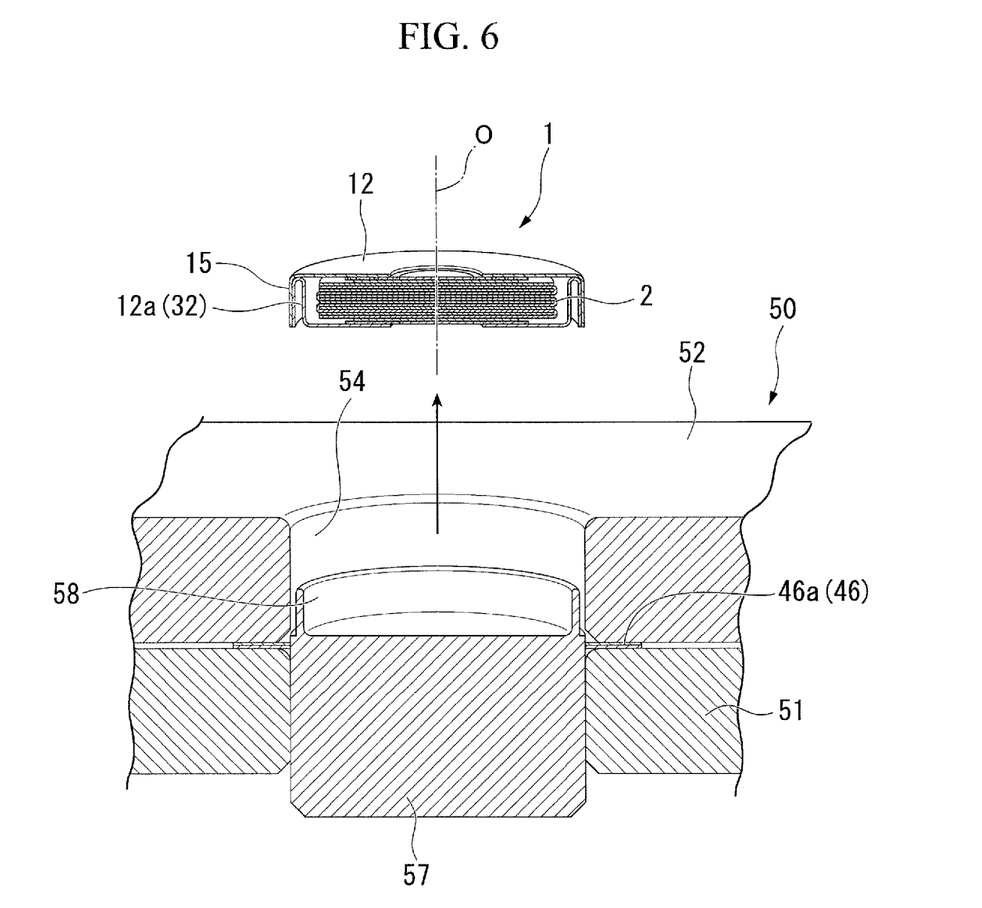
FIG. 6 is a cross-sectional view illustrating a state where the battery is removed from the molding die.

FIG. 6 is a cross-sectional view illustrating a state where the battery is removed from the molding die.

In FIG. 6, the manufactured battery is removed from the upper through hole 54. The sealing portion 15 of the battery 1 is bent along the outer circumference 12a of the housing portion 12. Accordingly, the sealing portion 15 may be approached to the outer circumference 12a of the housing portion 12. The overhanging portion of the sealing portion 15 in a direction orthogonal to the center axis O of the housing portion 12 can be reduced. Accordingly, especially in a compact battery, the capacity of the battery 1 per unit volume can be enhanced.

Accordingly to the battery 1, the overhanging portion of the housing portion 12 in a direction orthogonal to the center axis O can be further reduced by cutting the outer circumference 46a of the sealed heat fusion portion 46.

Furthermore, after the sealing portion 15 is drawn by the molding die 50, in the cutting process, the outer circumference 46a is cut from the sealing portion 15 using the molding die 50. Consequently, after the sealing portion 15 is drawn, in the cutting process, the outer circumference 46a is quickly cut from the sealing portion 15 and it is possible to improve productivity of the battery 1.

In FIGS. 3 to 6, the above mentioned embodiment that cuts the outer circumference 46a from the sealing portion 15 using the molding die 50 have been described, but the present invention is not limited to this. For example, the molded battery 1 may be removed from the molding die 50, and the outer circumference 46a may be cut from the sealing portion 15 by another cutting apparatus different from the molding die 50 after the sealing portion 15 is drawn.

Accordingly, the suitable cutting apparatus for the cut of the outer circumference 46a may be selected, and the outer circumference 46a may be cut suitably from the sealing portion 15 by the selected cutting apparatus. A cutter that is capable of rotating, laser, or the like can be used as the cutting apparatus, Modified Example In the above embodiment, the laminate member is formed using both the first container 17 and the second container 18, and the positive electrode terminal and the negative electrode terminal are provided as the through electrode in the laminate member, but it is not limited to this. For example, one of the first container 17 and the second container 18 may be formed by the laminate member, and the through electrode may be provided in one of the first container 17 and the second container 18.

When the first container 17 is formed by the laminate member, the second container 18 may be formed by metal. When the second container 18 is formed by the laminate member, the first container 17 may be formed by metal. When one of the first container 17 and the second container 18 is the metal, the metal container may be used as a terminal part.

Both the first container 17 and the second container 18 may be metal. In this case, in the state where primer is applied between the bending portion 33 and the first peripheral wall portion 22, the bending portion 33 and the first peripheral wall portion 22 are connected by heat fusion. Since both the first container 17 and the second container 18 are metal, the first container 17 and the second container 18 may be used as a terminal part.

Next, a second embodiment to a fifth embodiment of the present invention will be described based on FIGS. 7 to 10. In the second embodiment to the fifth embodiment, components common to those of the first embodiment of the respective embodiments already described will be designated by the same reference numerals, and duplicate description will be omitted.

Second Embodiment

Figure 7:
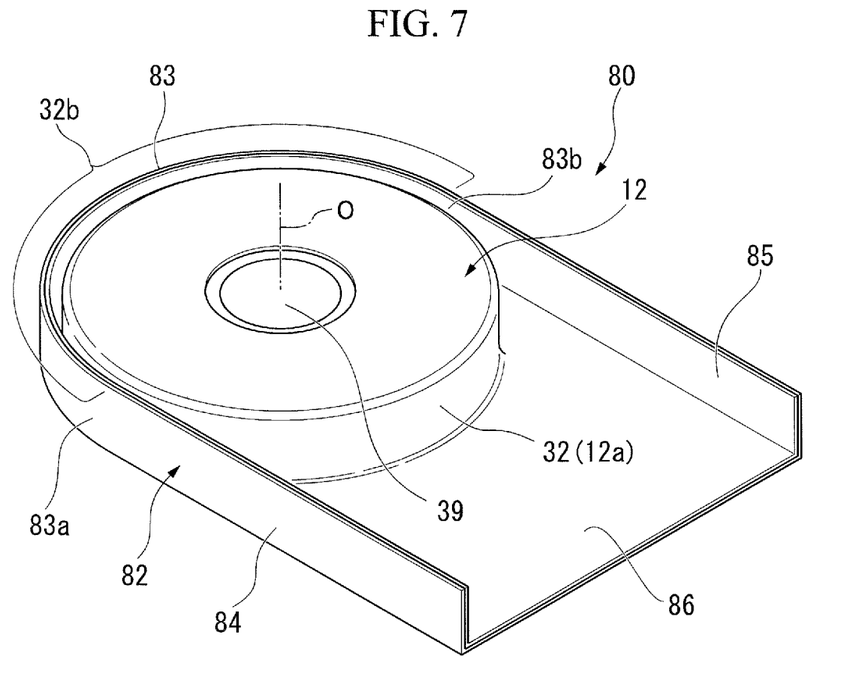
FIG. 7 is a perspective view illustrating a battery of the second embodiment.

Next, the battery 80 of the second embodiment will be described based on FIG. 7. FIG. 7 is a perspective view illustrating a battery of the second embodiment. As shown in FIG. 7, a sealing portion 82 of the battery 80 is different from the sealing portion 15 of the first embodiment. Other components are similar to the battery 1 of the first embodiment.

The sealing portion 82 includes a curve portion 83, a pair of straight parts 84, 85, and a flat portion 86. The curve portion 83 is formed into a curved and semicircular shape along one side of a half portion 32b among the second peripheral wall portion 32.

The straight part 84 extends linearly from a first end 83a of the curve portion 83. The straight part 85 extends linearly from a second end 83b of the curve portion 83. The flat portion 86 is arranged between the pair of straight parts 84 and 85. The pair of straight parts 84 and 85 are connected by the flat portion 86.

According to the battery 80 of the second embodiment, the curve portion 83 can be approached to the half portion 32b of one side of the second peripheral wall portion 32 by bending the curve portion 83 along the half portion 32b of one side of the second peripheral wall portion 32. Consequently, the overhanging portion of the curve portion 83 in a direction orthogonal to the center axis O of the housing portion 12 can be reduced.

Third Embodiment

Next, the battery 90 of the third embodiment will be described based on FIG. 8.

Figure 8:
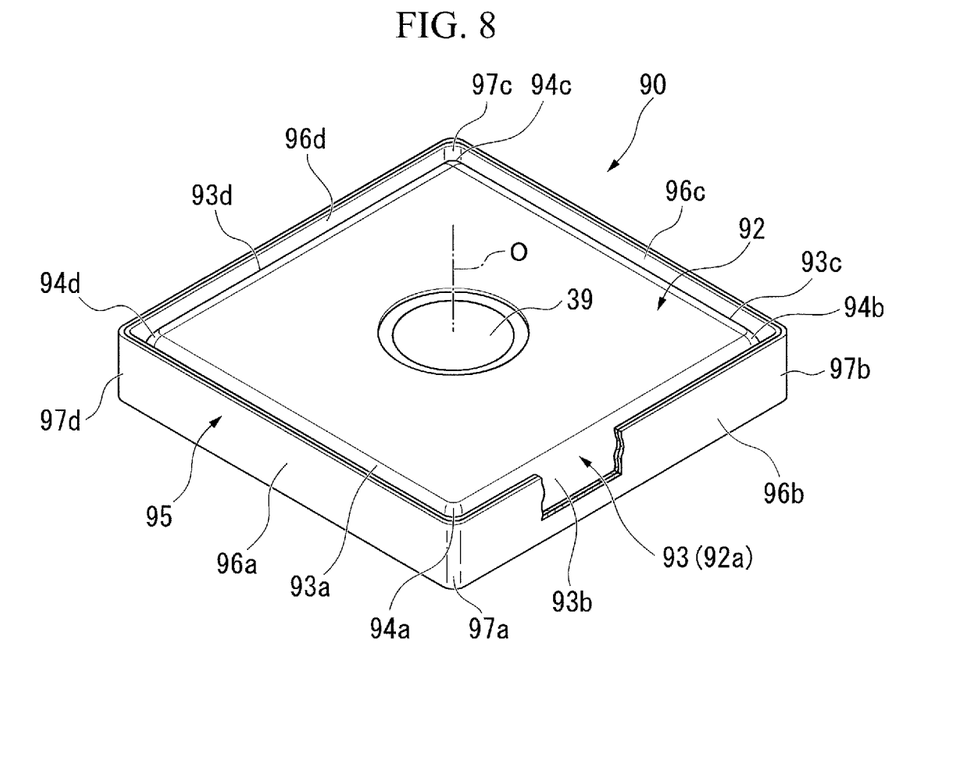
FIG. 8 is a perspective view illustrating a battery of the third embodiment.

FIG. 8 is a perspective view illustrating a battery of the third embodiment.

As shown in FIG. 8, the battery 90 which is formed into a rectangular shape is different from the battery 1 of the first embodiment. Other components are similar to the battery 1 of the first embodiment.

The battery 90 includes a housing portion 92 which is formed into the rectangular shape, and a sealing portion 95 which is formed into a rectangular frame shape. The housing portion 92 includes four wall portions 93a to 93d in which a second peripheral wall portion 93 extends linearly, and four corner portions 94a to 94d which are connected to adjacent the four wall portions 93a to 93d. An outer circumference 92a of the housing portion 92 is formed by the second peripheral wall portion 93.

The sealing portion 95 includes straight parts 96a to 96d which is bent along the four wall portions 93a to 93d, and four curve portions 97a to 97d which are connected to adjacent the straight parts 96a to 96d. The straight parts 96a to 96d are formed linearly along the four wall portions 93a to 93d of the housing portion 92. Accordingly, the straight parts 96a to 96d can approach the four wall portions 93a to 93d.

The four curve portions 97a to 97d are formed in a curved shape in plane view along the four corner portions 94a to 94d. Accordingly, the four curve portions 97a to 97d can approach the four corner portions 94a to 94d of the housing portion 92.

According to the battery 90 of the third embodiment, the straight parts 96a to 96d of the sealing portion 95 can approach the four wall portions 93a to 93d. Furthermore, the four curve portions 97a to 97d can approach the four corner portions 94a to 94d of the housing portion 92. Consequently, the overhanging portion of the straight parts 96a to 96d and the overhanging portion of the four curve portions 97a to 97d in a direction orthogonal to the center axis O of the housing portion 92 can be reduced. That is, the overhanging portion of the sealing portion 95 can be reduced.

Fourth Embodiment

Next, the battery 100 of the fourth embodiment will be described based on FIG. 9.

Figure 9:
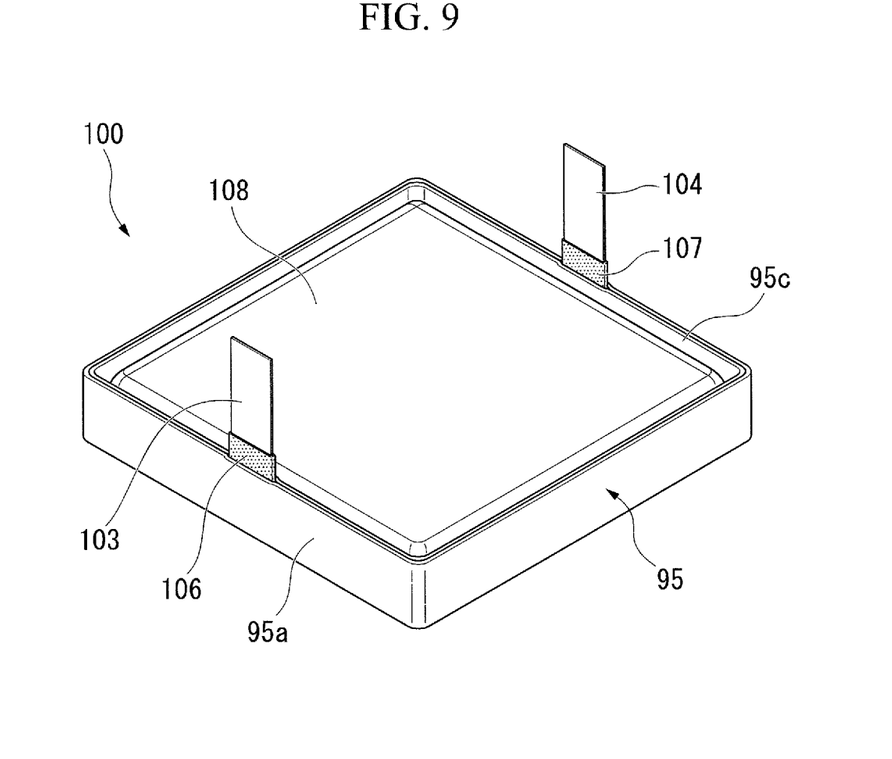
FIG. 9 is a perspective view illustrating a battery of the fourth embodiment.

FIG. 9 is a perspective view illustrating a battery of the fourth embodiment.

As shown in FIG. 9, the battery 100 in which a pair of terminal portions 103, 104 are projected from the sealing portion 95 is different from the battery 90 of the third embodiment. Other components are similar to the battery 90 of the third embodiment.

The pair of terminal portions 103, 104 are held by straight parts 95a, 95c which are arranged in parallel via sealant films 106, 107 among the sealing portion 95 and are projected from straight parts 95a, 95c toward an outside.

The pair of terminal portions 103, 104 are bent together with the sealing portion 95. Accordingly, the pair of terminal portions 103, 104 can be approached to the housing portion 108 side and it is possible to provide the battery 100 which can reduce the size. The housing portion 108 is made of the same member of the housing portion 92.

Fifth Embodiment

Figure 10:
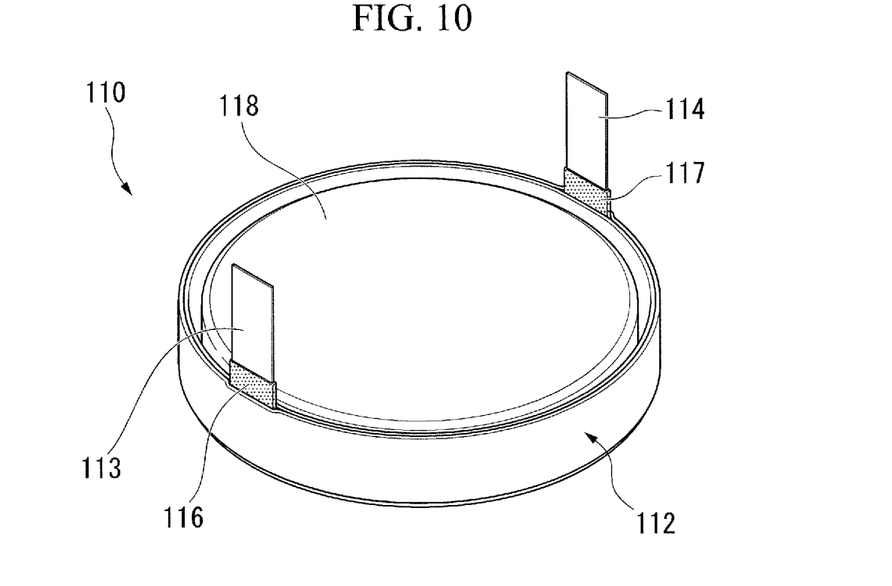
FIG. 10 is a perspective view illustrating a battery of the fifth embodiment.

Next, the battery 110 of the fourth embodiment will be described based on FIG. 10. FIG. 10 is a perspective view illustrating a battery of the fourth embodiment.

As shown in FIG. 10, the battery 110 in which a pair of terminal portions 113, 114 are projected from the sealing portion 112 is different from the battery 1 of the first embodiment. Other components are similar to the battery 1 of the first embodiment.

The pair of terminal portions 113, 114 are held by the sealing portion 112 via sealant films 116, 117 and are projected from the sealing portion 112 toward an outside.

The pair of terminal portions 113, 114 are bent together with the sealing portion 112. Accordingly, the pair of terminal portions 113, 114 can approach the housing portion 118 side, and the electrochemical cell can be miniaturized. The housing portion 118 is made of the same member of the housing portion 12.

While preferred embodiments of the present invention have been described, the present invention is not limited to the embodiments. Additions, omissions, substitutions, and other variations may be made to the present invention without departing from the spirit and scope of the present invention. The present invention is not limited by the above description, but by the appended claims.

In the above embodiments, an example that houses the electrode body 2 which is folded so that the negative electrode 3 and the positive electrode 4 are stacked alternately with each other and which is a stacked type in the housing portions 12, 92, 108, and 118 has been described. However, the present invention is not limited to this. As another electrode body, the electrode body that is a winding type and a pellet type can be housed in the housing portion 12. The electrode body of the winding type is that the negative electrode 3 and the positive electrode 4 are wound. The electrode body of the pellet type is that the negative electrode 3 and the positive electrode 4 are arranged at both sides of the separator.

In the above embodiments, an example that hold the outer circumference 46a of the sealed heat fusion portion 46 by the mounted portion 51a of a lower mold 51 and the pressing portion 52a of the upper mold 52 has been described. However, the present invention is not limited to this. As another example, a recess is formed in the inner circumference side of at least one of the mounted portion 51a and the pressing portion 52a, and the outer circumference 46a cannot be contacted with respect to the recess.

Accordingly, when the sealing portion 15 is drawn by the molding die 50, a noncontact portion with respect to the recess among the outer circumference 46a can approach the sealing portion 15. Consequently, the sealing portion 15 can be preferably drawn.

What is claimed is:

1. An electrochemical cell comprising:
an electrode body including a positive electrode and a negative electrode; and
a cylindrical outer package comprising overlapping first and second members,
wherein the first and second members comprise a laminate member that is configured to stack a metal sheet, a resin fusion layer, and a resin protective layer, and
wherein the outer package includes:
a housing portion that houses the electrode body; and
a cylindrical sealing portion along an outer circumference of the housing portion, the sealing portion comprising a bended and fused portion of the first member and the second member having a curved shape along an entire outer circumference of the housing portion and comprising a single upstanding wall spaced away from the housing portion.

2. The electrochemical cell according to claim 1, further comprising a terminal part supported by the sealing portion bended together with the sealing portion, where the terminal part does not protrude from the sealing portion.

3. The electrochemical cell according to claim 1, wherein the sealing portion of the first member is thinner than other portions of the first member, and the sealing portion of the second member is thinner than other portions of the second member.

4. The electrochemical cell according to claim 1, wherein a through electrode penetrates the laminate member of at least one of the first and second seal members.

5. The electrochemical cell according to claim 1, wherein the at least one of the first member and the second member includes a metal sheet.

6. The electrochemical cell according to claim 1, wherein the laminate member includes a through hole coaxial with a center axis electrochemical cell, and the electrochemical cell further includes a through electrode electrically connected to the electrode body and exposed by the through hole.

7. A manufacturing method of an electrochemical cell, comprising:
a sealing process that seals a sealing portion of an outer circumference of a housing portion in which houses an electrode body;
a fixing process that fixes a part of the sealing portion which is sealed in the sealing process; and
a molding process that bends other portion of the sealing portion that is not fixed in the fixing process, while the fixing process is being performed.

8. The manufacturing method of the electrochemical cell according to claim 7, further comprising: a cutting process that cuts the part of the sealing portion after the molding process.

9. The manufacturing method of the electrochemical cell according to claim 8, wherein the other portion of the sealing portion is bent by a molding die, and the part of the sealing portion is cut by the molding die in the molding process.

10. The manufacturing method of the electrochemical cell according to claim 8, wherein the other portion of the sealing portion is bent by a molding die, and the part of the sealing portion is cut by another cutting apparatus different from the molding die in the molding process.

11. An electrochemical cell comprising:
- an electrode body that includes a positive electrode and a negative electrode; and
- an outer package including overlapping first and second members,
- wherein the outer package includes:
- a housing portion that houses the electrode body; and
- a sealing portion along an outer circumference of the housing portion, fused and bended regions of the first member and the second member, at a portion corresponding to the outer circumference of the housing portion,
- wherein the second member is a metal where the first member is a laminate member, or the first member is a metal where the second member is a laminate member, and
- wherein the laminate member is configured to stack a metal sheet, a resin fusion layer, and a resin protective layer.

12. The electrochemical cell according to claim 11, wherein a through hole coaxial with a center axis electrochemical cell is in the laminate, and the electrochemical cell further includes a through electrode electrically connected to the electrode body and exposed by the through hole.

\* \* \* \* \*